(12) United States Patent
Longevialle et al.

(10) Patent No.: US 10,040,731 B2
(45) Date of Patent: Aug. 7, 2018

(54) COMPOSITE PYROTECHNIC PRODUCT WITH ADN AND RDX CHARGES IN A GAP TYPE BINDER, AND PREPARATION THEREOF

(71) Applicant: AIRBUS SAFRAN LAUNCHERS SAS, Paris (FR)

(72) Inventors: Yves Longevialle, Bretigny sur Orge (FR); Martine Golfier, Mennecy (FR); Fabienne Morin, Saulx les Chartreux (FR)

(73) Assignee: AIRBUS SAFRAN LAUNCHERS SAS, Paris (FR)

( * ) Notice: Subject to any disclaimer, the term of this patent is extended or adjusted under 35 U.S.C. 154(b) by 0 days.

(21) Appl. No.: 15/522,650

(22) PCT Filed: Oct. 27, 2015

(86) PCT No.: PCT/FR2015/052889
§ 371 (c)(1),
(2) Date: Apr. 27, 2017

(87) PCT Pub. No.: WO2016/066946
PCT Pub. Date: May 6, 2016

(65) Prior Publication Data
US 2017/0320787 A1 Nov. 9, 2017

(30) Foreign Application Priority Data

Oct. 28, 2014 (FR) ..................................... 14 02432

(51) Int. Cl.
| | | |
|---|---|---|
| *C06B 25/34* | (2006.01) | |
| *C06B 45/10* | (2006.01) | |
| *C06B 45/02* | (2006.01) | |
| *C06B 31/00* | (2006.01) | |
| *C08G 59/28* | (2006.01) | |
| *C08G 59/62* | (2006.01) | |

(52) U.S. Cl.
CPC ............ *C06B 45/105* (2013.01); *C06B 25/34* (2013.01); *C06B 31/00* (2013.01); *C06B 45/02* (2013.01); *C08G 59/28* (2013.01); *C08G 59/62* (2013.01)

(58) Field of Classification Search
CPC ....... C06B 25/34; C06B 45/105; C06B 31/00; C06B 45/02; C08G 59/28; C08G 59/62
USPC ........................................................ 149/19.6
See application file for complete search history.

(56) References Cited

U.S. PATENT DOCUMENTS

| | | |
|---|---|---|
| 4,938,813 A | 7/1990 | Eisele et al. |
| 5,061,330 A | 10/1991 | Reed, Jr. et al. |
| 5,507,891 A | 4/1996 | Zeigler |
| 5,690,868 A | 11/1997 | Strauss et al. |
| 2003/0047260 A1 | 3/2003 | Chan et al. |

FOREIGN PATENT DOCUMENTS

| | | |
|---|---|---|
| EP | 1 331 213 A2 | 7/2003 |
| FR | 2 884 244 A1 | 10/2006 |
| FR | 2 954 309 A1 | 6/2011 |
| FR | 2 997 695 A1 | 5/2014 |
| WO | WO 98/49123 A1 | 11/1998 |

OTHER PUBLICATIONS

International Preliminary Report on Patentability and then Written Opinion of the International Searching Authority as issued in International Patent Application No. PCT/FR2015/052889, dated May 2, 2017.
International Search Report as issued in International Patent Application No. PCT/FR2015/052889, dated Jan. 5, 2016.
Search Report as issued in French Patent Application No. 1402432, dated Jul. 17, 2015.
Database Compendex [Online], Engineering Information, Inc., Feb. 2012; Gu, J., et al., "Energy characteristics calculation of insensitive and minimum smoke GAP solid propellant," XP002742390, Database accession No. E20121814985451.
Menke, M., et al., "Formulation and Properties of AND/GAP Propellants," Propellants, Explosives, Pyrotechnics—Special Issue: 50 Years of Fraunhofer Institute for Chemical Technology, Jun. 2009, vol. 34, No. 3, XP002742391, pp. 218-230.
Landsem, E., et al., "Mechanical Properties of Smokeless Composite Rocket Propellants Based on Prilled Ammonium Dinitramide," Propellants, Explosives, Pyrotechnics, Dec. 2012, vol. 37, No. 6, XP002742392, pp. 691-698.
Database Compendex [Online], Engineering Information, Inc., Dec. 2007; Zhang, L.-Y., et al., "Interaction of AND with nitrate oxidizer," XP002742393, Database accession No. E20080611079462.
Landsem, E., et al., "Isocyanate-Free and Dual Curing of Smokeless Composite Rocket Propellants," Propellants, Explosives, Pyrotechnics, Feb. 2013, vol. 38, No. 1, XP002742394, pp. 75-86.

(Continued)

*Primary Examiner* — Edward Johnson
(74) *Attorney, Agent, or Firm* — Pillsbury Winthrop Shaw Pittman LLP

(57) ABSTRACT

A composite pyrotechnic product containing energetic charges in a plasticized binder includes a cured energetic polymer and at least one energetic plasticizer, wherein: the cured energetic polymer consists of a glycidyl azide polymer (GAP) having a number average molecular weight (Mn) lying in the range 700 g/mol to 3000 g/mol and cured via its hydroxyl terminal functions with at least one curing agent of polyisocyanate type; and the energetic charges present at a content in the range 50% to 70% by weight consisting, for at least 95% of their weight, of large crystals of ammonium dinitramide (ADN) and of small crystals of hexogen (RDX): the large crystals of ammonium dinitramide (ADN) being present at a content in the range 8% to 65% by weight; and the small crystals of hexogen (RDX) being present at a content in the range 5% to 55% by weight.

14 Claims, 1 Drawing Sheet

(56) References Cited

OTHER PUBLICATIONS

Larsson, A., et al., "Green Propellants Based on Ammonium Dinitramide (ADN)," Advances in Spacecraft Technologies, ISBN 978-953-307-8, Feb. 2011, pp. 139-156.

Chan, M.L,, et al., "Minimum-signature propellant with mixed-oxidizer concept," NATO Unclassified, RTO-MP-23, AC/323(AVT)TP/11, paper presented at RTO AVT Symposium in Apr. 1999, and published in RTO MP-23, pp. 41-1-41-41-8.

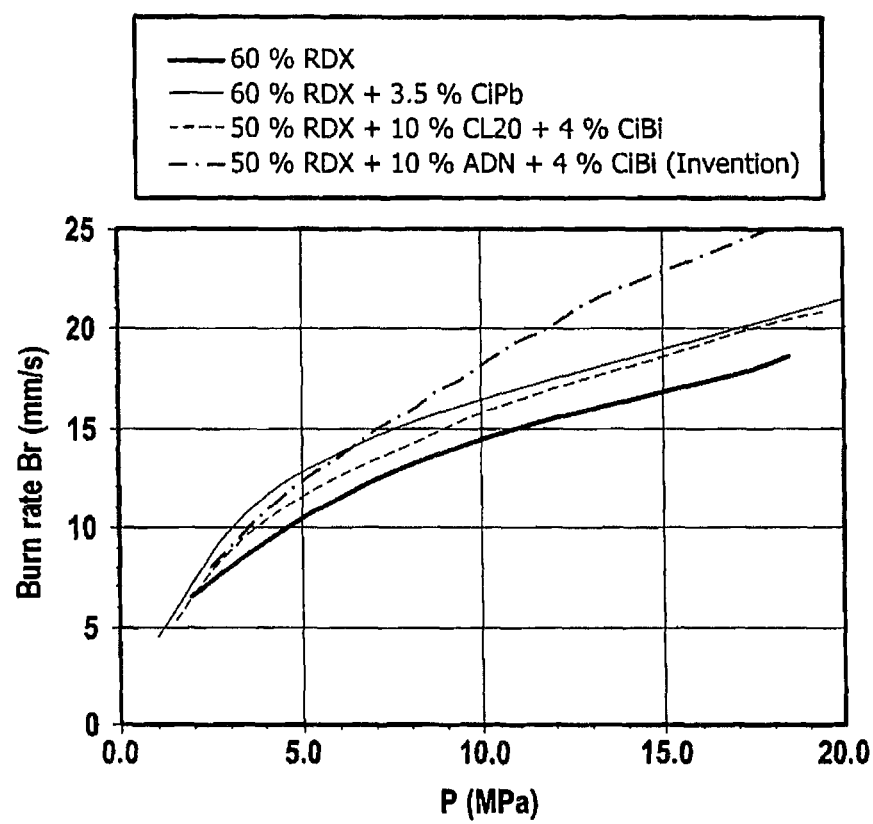

COMPOSITE PYROTECHNIC PRODUCT WITH ADN AND RDX CHARGES IN A GAP TYPE BINDER, AND PREPARATION THEREOF

CROSS-REFERENCE TO RELATED APPLICATIONS

This is the U.S. National Stage of PCT/FR2015/052889, filed Oct. 27, 2015, which in turn claims priority to French Application No. 1402432, filed Oct. 28, 2014, the entire contents of all applications are incorporated herein by reference in their entireties.

The present invention relates to composite pyrotechnic products, suitable in particular for use as solid propellants for propulsive loads of rocket engines, and more particularly as solid propellants for propulsive loads of tactical missile engines. These are composite pyrotechnic products containing a high content of energetic charges in an energetic binder. Said products, intended most particularly for use in tactical missile engines, present performance that is high:
in terms of burn rate;
in terms of specific impulse; and
in terms of discretion, i.e. in their composition they contain no, or only very little, ingredients that, on combustion, generate halogen products or liquid or solid products that give rise to a large visible or infrared "signature".

In the field of tactical missiles, it is desired to have so-called "clean" propellants, i.e. propellants that are very discreet and that present a high burn rate, most advantageously greater than or equal to 20 millimeters per second (mm/s) at a pressure of 10 megapascals (MPa), and with high specific impulse, most advantageously greater than 245 seconds (s) (when calculated at 7 MPa for a 70/1 expansion ratio). In any event, it is desired over a short length of time to generate a flow rate of gas that provides strong thrust.

At present, so-called "clean" propellants contain ammonium nitrate as energetic charge. The specific impulse and the burn rate of such propellants remain low.

The publication by Anders Larsson and Niklas Wingborg (2011) entitled "Green propellants based on ammonium dinitramide (ADN)", in "Advances in spacecraft technologies, Dr. Jason Hall (ed.), ISBN 978-953-307-8", evaluates propellants containing energetic charges of ammonium dinitramide (which charges are introduced in the form of "prills" (i.e. spherical granules (beads) prepared from crystals)), typically at (high) percentages by weight of 70% to 80% in an energetic binder of glycidyl azide polymer (GAP) type. Such propellants have high burn rates, about 30 mm/s at 10 MPa. They also present high specific impulse, of about 300 s (value calculated in a vacuum, corresponding to a (calculated) value of about 256 s at 7 MPa for a 70/1 expansion ratio). Theoretically, they therefore satisfy the need.

Nevertheless, the person skilled in the art knows that using ADN in the form of prills makes the processing of any material containing said ADN more expensive. It would be desirable to use ADN crystals obtained directly by crystallizing ADN in solution at the end of one of the processes for synthesizing it, or to use such crystals that have merely been ground. Said person skilled in the art is also aware of the difficulties involved in:
handling crystals of ADN: said crystals absorb water, leading to serious problems (with such absorption increasing with decreasing size of said crystals); and
conditioning crystals of ADN in a polymer (specifically GAP) that is to be cured with polyisocyanates (in order to obtain the binder): because of its intrinsic acidity, ADN consumes a portion of the curing agent (polyisocyanate(s)) that is present and makes it necessary to use said agent at a content that becomes increasingly large when the ADN is itself present in large quantity. This inevitably degrades the level of performance of the final product (propellant).

Furthermore, the person skilled in the art knows that as a general rule, in order to obtain a binder containing a large content of crystals, it is necessary not only for the crystals in question to present a low aspect ratio, and ideally they should all be spherical, but also for the crystals to be present at different sizes, typically small crystals and large crystals (where the concepts of "small" and "large" are naturally relative), e.g. micrometer ($\mu m$) crystals or even sub-micrometer crystals, and crystals of the order of ten or even one hundred micrometers.

Unfortunately, at present, it is difficult to obtain small crystals of ADN (even after grinding) given the hygroscopic nature of said small crystals. Easily accessible ADN crystals generally have a size that is greater than or equal to 10 $\mu m$, and they are therefore not suitable for obtaining propellants, and more generally composite pyrotechnic products, having high charge contents. Propellants having high ADN crystal charge contents have thus not yet been developed industrially.

Given the above-summarized difficulties, the person skilled in the art has thus still not developed industrially propellants having high contents of (crystal) ADN charges in a GAP type binder (i.e. propellants of the (crystal) ADN/GAP type), with this applying in spite of the good performance to be expected of such propellants (see above).

Energetic charges other than ADN also exist, in particular hexogen (RDX), octogen (HMX), and hexanitrohexaazaisowurtzitane (CL20), for which producing crystals (small and large crystals) for the purpose of obtaining propellants having high charge contents is thoroughly mastered.

Patent applications FR 2 954 309 and FR 2 997 695 thus describe explosives with high contents of RDX, said RDX being present in the form of small and large crystals.

U.S. Pat. No. 4,938,813, U.S. Pat. No. 5,061,330, and U.S. Pat. No. 5,507,891 describe solid propellants containing energetic charges, octogen (HMX) or hexogen (RDX), in energetic binders that are plasticized with energetic plasticizers. The specific impulse of those propellants is much lower than that of ADN/GAP type propellants. Their burn rate is less than 15 mm/s at a pressure of 10 MPa, even though their composition contains a ballistic catalyst. During combustion of those propellants, the addition of a ballistic catalyst gives rise to particles, which degrades their discretion.

U.S. Pat. No. 5,690,868 describes two formulations for obtaining multilayer propellants with an energetic oxetane binder, one containing hexanitrohexaazaisowurtzitane (CL20) and the other hexogen (RDX) or octogen (HMX). The burn rate of the layer containing RDX or HMX is slower than the burn rate of the layer containing CL20. Nevertheless, although CL20 is thus a potentially advantageous candidate (in any event more advantageous than RDX or HMX) as a substitute for ADN, its pyrotechnic sensitivity makes it difficult to use, most particularly at a high content (>30% by weight). It therefore cannot be used as an alternative for ADN.

Specifically, the person skilled in the art is well aware of the sensitivity of CL20 per se, and of the high sensitivity of an ADN/CL20 complex that might form when those two types of charge (in the crystal state) are both present (see the publication in RTO MP-23, 41-1 to 41-8 by May L. Chan and Alan D. Turner entitled "Minimum-signature propellant with mixed-oxidizer concept" (corresponding to the document presented at the RTO AVT Symposium on "Small rocket motors and gas generators for land, sea, and air launched weapon systems", that was held in Corfu (Greece) Apr. 19 to 23, 1999)).

Patent application US 2003/0047260 describes propellants containing crystals of ADN, prills of ADN, and/or crystals of CL20, in an energetic binder plasticized with energetic plasticizer(s). Said propellants present a minimum signature and high specific impulse (it gives a calculated value of 265 s at 7 MPa for a 70/1 expansion ratio), for such propellants with ADN charges or with ADN charges and CL20 charges. A combustion catalyst (ballistic catalyst) of the carbon black type is advantageously present in the composition of said propellants. That document describes particularly propellants with crystals of ADN, propellants with crystals and prills of ADN, and propellants with prills of ADN and crystals of CL20. In the presence of carbon black (ballistic catalyst), the burn rate of those propellants is about 25 mm/s at 10 MPa (see FIGS. 2 to 6 of said application).

The prior art thus teaches on the one hand, that GAP/ADN type propellants having a high content of energetic charges (ADN included in the form of prills) present a burn rate and a specific impulse that are large, but that the properties (most particularly the grain size) of the crystals of ADN are incompatible with feasibility of propellants of the type comprising GAP and crystals of ADN, with a high crystal content, and on the other hand, that if consideration is given only to performance, then CL20 is an advantageous potential substitute (at least in part) for ADN.

Since composite pyrotechnic products containing charges of RDX are known for producing a burn rate that is smaller than those containing charges of CL20, RDX does not appear in any way from the teaching of the prior art to be an advantageous candidate for association with ADN when seeking to achieve the looked-for performance in the context of the invention (high levels of burn rate, specific impulse, and discretion).

In such a context, the Applicant now proposes a novel composite pyrotechnic product with particularly high performance.

The Applicant has the merit of having identified, in spite of the teaching of the prior art (see above), that it is advantageous to formulate charges of ADN (crystals) together with charges of RDX (crystals) in a GAP type binder, with this applying in particular with reference to the looked-for targets of high burn rate and specific impulse; it being possible to achieve said targets without making use of components that are detrimental in terms of signature (discretion). This combined formulation is found to be particularly advantageous in a variant A="high" content of ADN and "low" content of RDX, while also being advantageous in a variant B="high" content of RDX and "low" content of ADN, so that in general terms it is advantageous in the range of contents by weight of ADN and of RDX as specified below. It is specified at this point that the concepts of "high" and "low" content are relative concepts that may be identical or non-identical depending on context.

In a first aspect, the present invention thus provides novel composite pyrotechnic products. They are of the type comprising a cured energetic binder containing energetic charges. More precisely, they comprise energetic charges in a plasticized binder comprising a cured energetic polymer and at least one energetic plasticizer. In characteristic manner:
  said cured energetic polymer consists of a glycidyl azide polymer (GAP) having a number average molecular weight (Mn) lying in the range 700 grams per mole (g/mol) to 3000 g/mol and cured via its hydroxyl terminal functions with at least one curing agent of polyisocyanate type; and
  said energetic charges present (in the composition of said product) at a (high) content in the range 50% to 70% by weight consisting, for at least 95% of their weight, of large crystals of ammonium dinitramide (ADN) and of small crystals of hexogen (RDX):
    said large crystals of ammonium dinitramide (ADN) being present (in the composition of said product) at a content in the range 8% to 65% by weight, advantageously in the range 10% to 60% by weight; and
    said small crystals of hexogen (RDX) being present (in the composition of said product) at a content in the range 5% to 55% by weight, advantageously in the range 8% to 50% by weight.

The structure of composite pyrotechnic products of the invention thus associates, in characteristic manner:
  a specific energetic binder comprising a cured energetic polymer of (hydroxytelechelic) GAP type and at least one energetic plasticizer; and
  a large content (50% to 70% by weight) of energetic charges in the crystal state, of which at least 95% by weight, generally at least 97% by weight, or indeed 100% by weight comprise energetic charges (crystals) of specific nature: (highly energetic) ADN+RDX (which has been found, unexpectedly, to be a partner for said ADN that is much more advantageous than CL20). It can be said that there is a specific "cocktail" of energetic charges (crystals): ADN+RDX.

The looked-for research, concerning the high content of charges is obtained ("in a manner that is known per se") by the combined presence of large crystals (of easily obtained ADN) and of small crystals (of RDX, which are likewise easily obtained). These concepts of "large" and "small" are naturally relative. It can be stated that the ADN crystals in question are generally at least five times larger than the RDX crystals in question, and more generally at least ten times larger or even 25 times larger. The RDX crystals that are present are advantageously of micrometer size: thus, they advantageously have a size in the range 1 μm to 10 μm (extreme values included), and very advantageous in the range 2.5 μm to 5 μm (extreme values included). It can naturally be understood that said crystals advantageously present sizes in the range 1 μm to 10 μm (each crystal presenting a respective size), and very advantageously in the range 2.5 μm to 5 μm. The crystals of ADN that are present advantageously present a size in the range 50 μm to 250 μm (extreme values included); it can be understood that said crystals present sizes in the range 50 μm to 250 μm (each crystal presenting a respective size). The concept of crystal size (as used herein with reference to the crystals of RDX and of ADN) is a general concept familiar to the person skilled in the art. It refers to grain-size fractions obtained by screening.

Associating small and large crystals (that are easy to obtain) in this way is particularly advantageous, firstly in that there is no need to have small crystals of ADN (see the difficulty mentioned above in obtaining such small crystals and the "acute" problem of said small crystals absorbing water), and also in that it thus enables a product to be obtained that has a high charge content. In addition, since the density of RDX (1.82 grams per cubic centimeter (g/cm$^3$) is close to the density of ADN (1.81 g/cm$^3$), both charges (both types of crystal) become homogeneously distributed in the product when performing the method of obtaining the product, and without any particular difficulty.

This association is found to be particularly advantageous with reference to the looked-for performance.

The nature of the binder (the nature of its precursor polymer) thus constitutes one of the key elements for the composition of composite pyrotechnic products of the invention.

It should be observed in passing that the term "a" glycidyl azide polymer (=precursor polymer for the binder) should be understood as "at least one" glycidyl azide polymer throughout the present specification. Specifically, the ambit of the invention does not in any way exclude a mixture of at least two glycidyl azide polymers (presenting different molecular weights (in the range 700 g/mol to 3000 g/mol) and/or different degrees of branching) being used as a precursor polymer for the binder in products of the invention.

The energetic polymer selected as the precursor for the binder of products of the invention is thus an azide polymer, a glycidyl azide polymer (GAP) that presents hydroxy terminal functions (a hydroxytelechelic GAP); giving it: 1) its energetic properties; and 2) its ability to be cured with curing agents of the polyisocyanate type.

Said polymer has a suitable molecular weight (in particular with reference to its (liquid) consistency and to the consistency of its mixture essentially with the charges and with reference to the relative curing agent(s) content of the cured binder), a number average molecular weight (Mn) lying in the range 700 g/mol to 3000 g/mol, and advantageously lying in the range 1700 g/mol to 2300 g/mol.

The inventors have the merit of having selected this type of (precursor polymer for the) binder, of (precursor polymer for the) energetic binder, entirely suited for use with the selected energetic charges (the recommended "cocktail" of energetic charges present in the state of crystals).

Curing agents of the polyisocyanate type (having at least two functions) that are suitable for curing such a hydroxytelechelic glycidyl azide polymer (GAP) are themselves known. They may in particular be di- or tri-isocyanates. Advantageously they are liquid poly-isocyanates selected from toluene diisocyanate (TDI), isophorone diisocyanate (IDPI), methylene dicyclohexyl diisocyanate (MDCI), hexamethylene diisocyanate (HDI), the trimer of said hexamethylene diisocyanate (in particular as sold by the supplier Bayer under the trade name Desmodur® N 3300), biuret trihexane isocyanate (BTHI), 3,5,5-trimethyl-1,6-hexamethylene diisocyanate, and mixtures thereof. In particularly preferred manner, use is made of hexamethylene diisocyanate trimer.

Said curing agents are conventionally used in necessary and sufficient quantity to ensure that the polymer is cured (but not excessively so as to avoid polluting the resulting cured product). They are conventionally used in a quantity such that the bridging ratio of NCO (from the curing agent) over OH (of the polymer) lies in the range 0.8 to 1.4, and is advantageously 1.

The cured energetic polymer generally represents 10% to 14% by weight of the total composition of composite pyrotechnic products of the invention. The energetic polymer itself generally constitutes 8% to 12% by weight, with the at least one curing agent representing about 2% by weight.

It is clearly understood that the nature of the binder (the nature of its precursor polymer) is not of itself original, but that the advantage of the invention lies on associating (a precursor polymer for) such a binder with specific energetic charges.

In conventional manner, the energetic binder is associated with at least one energetic plasticizer. The energetic plasticizer(s) in question is/are advantageously of the nitrate and/or nitramine type. The energetic plasticizer(s) in question is/are most advantageously selected from diethylene glycol dinitrate (DEGDN), triethylene glycol dinitrate (TEGDN), butanetriol trinitrate (BTTN), trimethylolethane trinitrate (TMETN), a mixture of 2,4-dinitro-2,4-diaza-pentane, of 2,4-dinitro-2,4-diaza-hexane, and of 3,5-dinitro-3,5-diaza-heptane (and most particularly DNDA 5.7), and nitrato ethyl nitramines (in particular methyl-2-nitratoethyl nitramine (methylNENA) and ethyl-2-nitratoethyl nitramine (ethylNENA)), and mixtures thereof.

The plasticizer(s) of pyrotechnic products of the invention generally represent(s) 10% to 30% by weight, more generally 15% to 25% by weight, of the total composition of said products.

The specific nature of the energetic charges present (in the crystal state) (of the "cocktail" that is present of such energetic charges) thus constitutes the other of the key elements (of the composition) of composite pyrotechnic products of the invention.

Said specific nature resides, for one part in the nature of said charges ((crystals of) ADN+(crystals of) RDX), and for another part in the relative sizes of said charges (large crystals of ADN and small crystals of RDX); these relative sizes of said charges ((crystals of) ADN+(crystals of) RDX) make it possible to achieve an overall charge content that is large: in the range 50% to 70% by weight, and advantageously in the range 55% to 65% by weight.

It has been observed that the presence of energetic charges, other than charges of ADN (crystals) and charges of RDX (crystals), is not to be totally excluded. In any event, energetic charges other than ADN and RDX charges may optionally be present up to a maximum content of 5% by weight. The charges of composite pyrotechnic products of the invention are essentially, and possibly exclusively, constituted by said crystals of ADN and of RDX.

As mentioned above:
  the crystals of ADN are present in the range 8% to 65%, advantageously 10% to 60%, very advantageously in the range 40% to 60% by weight within the composition of products of the invention; and
  the crystals of RDX are present in the range 5% to 55%, advantageously 8% to 50%, most advantageously in the range 8% to 20% by weight in the composition of products of the invention.

In a particularly preferred variant, said crystals of ADN are present at a content in the range 40% to 60% by weight and said crystals of RDX at a content in the range 8% to 20% by weight.

Concerning the sizes of said charges (of crystals), reference may be made to the discussion above in the present text. Concerning the morphologies of said charges, it is clearly desirable for the crystals to present a small aspect ratio (≤2, advantageously ≤1.5), and ideally for them to be spherical.

In a variant of the invention (variant A above), and especially in the above particularly preferred variant, RDX is present as a partial substitute for ADN at a "small" content (typically ≤20%), thus in the form of small crystals, thereby making it possible to have a large content of charges (small crystals of RDX and large crystals of ADN), with a reduction in the magnitude of the problems that are inherent to ADN (insofar as less ADN, present in the form of large crystals, is present) and, in totally unexpected manner, the presence of said RDX nevertheless makes it possible to obtain burn rate and specific impulse values that are very advantageous (see the results for Example 1 in Table 1 below).

In another variant of the invention (above variant B), RDX is present at a "large" content (typically in the range 40% to 60% by weight) while ADN is present at a "small" content (typically in the range 8% to 20% by weight), thereby naturally making large charge content possible (small crystals of RDX and large crystals of ADN), with a consequent reduction in the intensity of the problems that are inherent to ADN, and in unexpected manner in the context of this variant also, advantageous values have been obtained for burn rate and specific impulse (even though they are less advantageous than in the context of the above first variant) (see the results of Example 2 in Table 1 below and Example 2' in FIG. 1).

It is recalled at this point, should that be necessary, that the concept of "large" and "small" contents are relative concepts that may be identical or non-identical depending on context. Furthermore, it should clearly be understood that the two above variants of the invention are not exhaustive (with formulating "equivalent" contents of ADN and of RDX together naturally forming an integral portion of the invention (see below)).

The absence of inorganic (crystals) charges other than ADN within the (the composition) of composite pyrotechnic products of the invention (or in any event any presence thereof being minimal in quantity (<3% by weight)) is advantageous with reference to the technical problem of the signature of said products in combustion (generating combustion smoke). Thus, the composition of composite pyrotechnic products of the invention is itself advantageously free from inorganic charges other than ADN.

The composition of composite pyrotechnic products of the invention is also free from metal charges (which might generate particles during combustion).

The composite pyrotechnic products of the invention may also contain within their binder, and indeed generally contain, at least one additive in addition to the charges and the plasticizer(s).

Among additives that are advantageously present, preference may be given to the following conventional additives: curing catalysts and stabilizer agents for the energetic plasticizer(s) that is/are present. Thus, in an advantageous variant, composite pyrotechnic products of the invention thus include in their composition, in addition to the cured polymer (GAP), the plasticizers, and charges, at least one additive; said at least one additive comprising at least one curing catalyst and/or at least one stabilizer agent for the plasticizer(s) that is/are present. Said at least one polymerization catalyst may in particular be selected from triphenylbismuth and dibutyl tin laurate (DBTL). When present, it is generally at a content that does not exceed a few hundred parts per million (ppm). Said at least one stabilizer agent for stabilizing the plasticizer(s) that is/are present may in particular consist of at least one aromatic amine, such as 2-nitrodiphenylamine (2-NDPA), and N-methyl para nitroaniline (MNA). When present, it is generally present at a content of about 1% by weight.

Other additives that may be present in the composition of composite pyrotechnic products of the invention may in particular consist of one or more working agents (processing auxiliary). Said agent(s) are generally present at a content in the range 1% to 2% by weight. Furthermore, it is not excluded that said composition contains at least one combustion catalyst (for optimizing its burn rate). It can be understood that the presence of at least one such combustion catalyst may be entirely superfluous within a composition containing a large content of ADN, but that it can be advantageous within a composition containing a small content of ADN. Such an at least one combustion catalyst (advantageously consisting of bismuth citrate) is thus not present, or in any event, is present only in small quantity ($\leq 4\%$ by weight). This is naturally advantageous with reference to the third stipulation of the specifications (discretion).

The additives that are optionally present (in the light of the above description, it can be understood that several types of additive are generally present) generally represent no more than 6% by weight of the composition of composite pyrotechnic products of the invention. Most generally, they represent 0.1% to 4% by weight of the composition of composite pyrotechnic products of the invention.

In the light of the above, it can be understood that composite pyrotechnic products of the invention are not products of a novel type but that they are novel in that they associate in their composition a specific binder ((hydroxytelechelic) GAP (cured by at least one polyisocyanate and plasticized by at least one energetic plasticizer) and a specific "cocktail" of energetic charges (crystals of ADN+ crystals of RDX)).

In the context of an advantageous variant, the composition of composite pyrotechnic products of the invention, expressed in percentages by weight, thus contains:
- 50% to 70%, advantageously 55% to 65% of energetic charges, consisting, for at least 95% of their weight, of crystals of ADN and crystals of RDX (see above);
- 10% to 14% of the cured energetic polymer (of the hydroxytelechelic GAP type) that is cured (via its hydroxy terminal functions by at least one polyisocyanate);
- 10% to 30%, advantageously 15% to 25%, of at least one energetic plasticizer; and
- 0% to 6%, advantageously 0.1% to 4%, of at least one additive.

In the context of this advantageous variant, said composition is generally free from any other ingredient and thus consists of the ingredients listed above, that are present in the quantities specified above. It is recalled incidentally at this point that said composition is advantageously free from any inorganic energetic charge other than ADN and free from any metallic charge, or indeed free from any inorganic energetic charge other than ADN, free from any metallic charge, and free from any combustion catalyst.

The products of the invention are thus advantageous in terms of burn rate, of specific impulse, and of small signature (discretion) of the plume generated during combustion, in particular as a propellant (the composition does not contain any metal charges that generate particles, and contains no or very little inorganic energetic charges other than ADN), and also because of their feasibility. Formulating large crystals of ADN together with small crystals of RDX in an energetic binder of GAP type makes it possible to obtain products having a large charge content, products that presents particularly high performance with reference to the specifications set out in the introduction to the present text. Associating ADN+RDX has thus been found, surprisingly, to be particularly advantageous. The above remarks are confirmed by the results in Table 1 below and the results shown in FIG. 1.

In a second aspect, the present invention provides a method of preparing a composite pyrotechnic product as described above. The method comprises:

constituting a homogeneous paste by:

a) adding, while stirring, to a suitable glycidyl azide polymer (hydroxytelechelic GAP presenting a number molecular weight as specified above), at least one energetic plasticizer, energetic charges, and other ingredients constituting the looked-for composite pyrotechnic product with the exception of any curing agent and of any curing catalyst; and b) stirring the resulting mixture under a partial vacuum;

under a partial vacuum, adding to said resulting homogeneous paste, said at least one curing agent and optionally at least one curing catalyst, followed by stirring the resulting mixture;

casting said stirred resulting mixture in at least one structure; and heat treating said stirred resulting mixture cast in said at least one structure.

The initial steps of the method (constituting the homogeneous paste and then mixing said paste with curing agent(s) and possibly curing catalyst(s)) are performed at one or more suitable temperatures, depending on the viscosity of the mixture in question, on the problem of the ADN that is present reacting with the at least one curing agent that is present (see the introduction to the present text) (and naturally with reference to the stability of the energetic charges that are present). These steps are generally performed at a temperature in the range 20° C. to 40° C. (20° C.≤T≤50° C.).

The heat treatment (curing) is generally performed at atmospheric pressure and at a temperature lying in the range 30° C. to 50° C. (30° C.≤T≤50° C.) for several days.

In any event, it is appropriate throughout the method to operate at a temperature that is not too high (≤50° C.) in order to minimize any reaction of ADN with the at least one curing agent.

The above-mentioned partial vacuum is for degassing the medium above which it is applied. It is generally 10 millimeters of mercury (mmHg). It should be observed that the vacuum is not necessarily of constant value.

The method may be considered as a method by analogy, but, in characteristic manner, it is performed with the (precursor polymer for) specific binder and the specific "cocktail" of energetic charges (crystals).

The invention is illustrated below by the following examples and accompanying FIG. 1.

Said accompanying FIG. 1 shows the burn rates ($r_b$), (as a function of pressure (P)) of a propellant of the invention and of three reference propellants.

A. More precisely, there follow comparative examples Ref. 1 to Ref. 5 and Examples 1 and 2 illustrating the invention.

In all of the examples, the same energetic polymer of hydroxytelechelic GAP type was used (as sold by the supplier Eurenco having a number average molecular weight (Mn) of 1900 g/mol), and the same curing agent (Desmodur® N 3300 sold by the supplier Bayer), the same plasticizers (BTTN/TMETN: 30/70 (% by weight)), and the same plasticizer stabilizers (MNA/2-NDPA: 75/25 (% by weight)), were used and also the same types of (crystal) charges were used, namely ADN: 50 μm to 250 μm, RDX: 2.5 μm to 10 μm, and CL20: 20 μm to 50 μm. The same method was carried out to obtain the propellant from mixtures of ingredients making up said propellant: initial mixing steps at 40° C., casting, then curing in a stove at atmospheric pressure and at 45° C. for 14 days.

In Table 1 below, the first portion gives the composition by weight of the propellants, while the second portion gives the properties of said propellants (burn rates and specific impulse). The burn rates were measured, while the specific impulses were calculated at 7 MPa for a 70/1 expansion ratio.

The results obtained with the products of Ref. 1 (no combustion catalyst) and of Ref. 2 (combustion catalyst: CiPb) confirm that RDX does not itself provide high performance.

The product of Ref. 3 (containing 62.5% by weight of large crystals of ADN) could not be tested insofar as it was not sound (the cured block contained too many bubbles, indicative of a reaction between ADN and hexamethylene diisocyanate (Desmodur® N 3300)). Calculation confirmed a high value for specific impulse (a value which is thus theoretical).

The product of Ref. 4 presents high performance, but obtaining it involves handling crystals of CL20 and conditioning crystals of CL20 and of ADN together.

The product of Ref. 5 (which involves handling crystals of CL20 in order to obtain it) confirms that the performance of mixture of RDX (50%)+CL20 (10%)+combustion catalyst (4%) is higher than the performance of RDX (65%) on its own (see the results for the product of Ref. 1). Said performance of said mixture of RDX (50%)+CL20 (10%)+combustion catalyst (4%) corresponds, most particularly concerning burn rate, to the performance of RDX (62.5%) with a combustion catalyst (3.5%) (see the results for the product of Ref. 2). This performance nevertheless remains lower, most particularly concerning burn rate, than the performance of an "equivalent" mixture of ADN (10%)+RDX (50%)+combustion catalyst (4%) in accordance with the invention (see the results for the product of Example 2).

Example 1 shows the particularly preferred variant of the invention in which ADN is present in the range 40% to 60% by weight (specifically 52% by weight) and RDX is present in the range 8% to 20% by weight (specifically at 9.82% by weight). In this example, said RDX is present as a partial substitute for said ADN. The propellant that is obtained presents very high performance. In general manner, propellants of the invention in this particularly preferred variant present high burn rates that are greater than 20 mm/s at 10 MPa and greater than 40 mm/s at 18 MPa, and this is achieved in the absence of any ballistic catalyst, and high specific impulses are also obtained, greater than 245 s (calculated at 7 MPa for a 70/1 expansion ratio).

Example 2 shows the variant of the invention in which RDX is present at a high content (>20% by weight, more precisely at 50% by weight), well above the ADN content (10% by weight). The combined presence of crystals of ADN, of crystals of RDX (ADN+RDX=60% by weight), and of the combustion catalyst CiBi is found to be most advantageous. The performance obtained is greater than that of RDX of its own (Ref. 1: 65% by weight of RDX), and greater than that of RDX (62.5% by weight) together with combustion catalyst (Ref. 2).

TABLE 1

|  |  | Ref. 1 | Ref. 2 | Ref. 3 | Ref. 4 | Ref. 5 | Ex. 1 | Ex. 2 |
|---|---|---|---|---|---|---|---|---|
|  | Binder/charge | GAP/RDX | GAP/RDX | GAP/ADN | GAP/ ADN/CL20 | GAP/ RDX/CL20 | GAP/ ADN/RDX | GAP/ ADN/RDX |
| Energetic charges | RDX | 65 | 62.5 | / | / | 50 | 9.82 | 50 |
|  | CL20 | / | / | / | 25 | 10 | / | / |
|  | ADN | / | / | 62.5 | 40 | / | 52 | 10 |
| Cured polymer | GAP | 10.63 | 9.63 | 9.63 | 10.63 | 10.63 | 9.82 | 10.63 |
|  | Desmodur ® N 3300 | 2.14 | 2.01 | 2.01 | 2.14 | 2.14 | 2.1 | 2.14 |
| Plasticizer | BTTN/TMETN | 20.57 | 19.7 | 19.7 | 20.57 | 21.37 | 23.70 | 20.57 |
|  | Stabilizers (MNA/2-NDPA) | 0.8 | 0.8 | 0.8 | 0.8 | 0.8 | 0.8 | 0.8 |
| Combustion catalyst | Lead citrate (CiPb) | / | 3.5 |  | / | / | / | / |
|  | Bismuth citrate (CiBi) |  |  | 3.5 |  | 4 |  | 4 |
| Process auxiliary |  | 0.86 | 1.86 | 1.86 | 0.86 | 1.06 | 1.76 | 1.86 |
| Properties | $r_b$ (mm/s) at 10 MPa | 8.8 | 16.4 | / | ~25 | 16.0 | 29.1 | 18.1 |
|  | $r_b$ (mm/s) at 18 MPa | 15.3 | 20.4 | / | ~33 | 20.4 | 42 | 25.2 |
|  | $I_{sp}$ (7 MPa) (s) | 236 | 236 | 251 | 258 | 247 | 250 | 239 |

B. Burn rates (as a function of pressure) were measured for products analogous to those of Table 1:
  a product of the invention according to an Example 2' (of composition containing 10% by weight of (50 μm-250 μm) crystals of ADN and 50% by weight of (2.5 μm-10 μm) crystals of RDX (i.e. 60% by weight of energetic crystals) in a binder (obtained from a premix (34.5% by weight of GAP (see A above)+triisocyanate (HDI trimer, Desmodur® N 3300 from Bayer)+(30/70) BTTN/TMETM+stabilizers for said BUN and TMETM)+4% by weight of bismuth citrate (combustion catalyst)+1.5% by weight of processing auxiliaries); and
  three reference products:
    a product Ref. 1' (of composition containing 60% by weight of (2.5 μm-10 μm) crystals of RDX in a binder (obtained from a premix {38.5% by weight of GAP (see A above)+triisocyanate (HDI trimer, Desmodur® N 3300 from Bayer)+(30/70) BTTN/ TMETM+stabilizers for said BUN and TMETM}+ 1.5% by weight of processing auxiliaries);
    a product Ref. 2' (of composition containing 60% by weight of (2.5 μm-10 μm) crystals of RDX in a binder (obtained from a premix {35% by weight of GAP (see A above)+triioscyanate (HDI trimer, Desmodur® N 3300 from Bayer)+(30/70) BTTN/ TMETM+stabilizers for said BUN and TMETM}+ 3.5% by weight of lead citrate (combustion catalyst)+1.5% by weight of processing auxiliaries);
    a product Ref. 5' (of composition containing 50% by weight of (2.5 μm-10 μm) and 10% by weight of (20 μm-50 μm) crystals of CL20 in a binder (obtained from a premix {34.5% by weight of GAP (see A above)+triioscyanate (HDI trimer, Desmodur® N 3300 from Bayer)+(30/70) BTTN/TMETM+stabilizers for said BUN and TMETM}+4% by weight of bismuth citrate (combustion catalyst)+1.5% by weight of processing auxiliaries).
Observation of the curves in FIG. 1 shows the advantage of composite pyrotechnic products of the invention, and more particularly the advantage of such products in accordance with the "low" content of ADN variant of the invention (variant B above).

The invention claimed is:

1. A composite pyrotechnic product containing energetic charges in a plasticized binder comprising a cured energetic polymer and at least one energetic plasticizer, wherein:
  said cured energetic polymer consists of a glycidyl azide polymer (GAP) having a number average molecular weight (Mn) lying in the range 700 g/mol to 3000 g/mol and cured via its hydroxyl terminal functions with at least one curing agent of polyisocyanate type; and
  said energetic charges present at a content in the range 50% to 70% by weight consisting, for at least 95% of their weight, of large crystals of ammonium dinitramide (ADN) and of small crystals of hexogen (RDX):
    said large crystals of ammonium dinitramide (ADN) being present at a content in the range 8% to 65% by weight; and
    said small crystals of hexogen (RDX) being present at a content in the range 5% to 55% by weight.

2. The composite pyrotechnic product according to claim 1, wherein said glycidyl azide polymer (GAP) has a number molecular weight (Mn) lying in the range 1700 g/mol to 2300 g/mol.

3. The composite pyrotechnic product according to claim 1, wherein said at least one energetic plasticizer is of the nitrate and/or nitramine type.

4. The composite pyrotechnic product according to claim 1, wherein said energetic charges are present at a content in the range 55% to 65% by weight.

5. The composite pyrotechnic product according to claim 1, wherein said crystals of ammonium dinitramide (ADN) are present at a content in the range 40% to 60% by weight and said crystals of hexogen (RDX) are present at a content in the range 8% to 20% by weight.

6. The composite pyrotechnic product according to claim 1, further comprising at least one additive.

7. The composite pyrotechnic product according to claim 6, wherein said at least one additive comprises at least one curing catalyst and/or at least one plasticizer agent for plasticizing the at least one energetic plasticizer.

8. The composite pyrotechnic product according to claim 1, wherein its composition, expressed in percentages by weight, contains:
  50% to 70% of said energetic charges, consisting, for at least 95% of their weight, of said crystals of ADN and said crystals of RDX;
  10% to 14% of said cured energetic polymer;
  10% to 30% of said at least one energetic plasticizer; and
  0% to 6% of at least one additive.

9. A method of preparing a composite pyrotechnic product according to claim 1, the method comprising:

constituting a homogeneous paste by:
- a) adding in said glycidyl azide polymer said at least one energetic plasticizer, energetic charges, and other ingredients constituting the looked-for composite pyrotechnic product with the exception of any curing agent and of any curing catalyst; and
- b) stirring the resulting mixture under a partial vacuum;

under a partial vacuum, adding to said resulting homogeneous paste, said at least one curing agent and optionally at least one curing catalyst, followed by stirring the resulting mixture; then casting said stirred resulting mixture in at least one structure; and heat treating said stirred resulting mixture cast in said at least one structure.

10. The composite pyrotechnic product according to claim 1, wherein said large crystals of ammonium dinitramide (ADN) are present at a content in the range 10% to 60% by weight.

11. The composite pyrotechnic product according to claim 1, wherein said small crystals of hexogen (RDX) are present at a content in the range 8% to 50% by weight.

12. The composite pyrotechnic product according to claim 8, wherein its composition, expressed in percentages by weight, contains 55% to 65% of said energetic charges.

13. The composite pyrotechnic product according to claim 8, wherein its composition, expressed in percentages by weight, contains 15% to 25% of said at least one energetic plasticizer.

14. The composite pyrotechnic product according to claim 8, wherein its composition, expressed in percentages by weight, contains 0.1% to 4% of at least one additive.

* * * * *